US010260646B2

(12) United States Patent
Dennis et al.

(10) Patent No.: US 10,260,646 B2
(45) Date of Patent: Apr. 16, 2019

(54) VALVE

(71) Applicant: Bifold Fluidpower Limited, Middleton (GB)

(72) Inventors: Michael T. Dennis, West Yorkshire (GB); Richard A. Burke, St. Helens (GB)

(73) Assignee: Bifold Fluidpower Limited, Greater Manchester (GB)

( * ) Notice: Subject to any disclaimer, the term of this patent is extended or adjusted under 35 U.S.C. 154(b) by 0 days.

(21) Appl. No.: 15/874,013

(22) Filed: Jan. 18, 2018

(65) Prior Publication Data
US 2018/0142794 A1 May 24, 2018

Related U.S. Application Data

(63) Continuation of application No. 13/814,314, filed as application No. PCT/GB2011/001132 on Jul. 29, 2011, now abandoned.

(30) Foreign Application Priority Data

Aug. 19, 2010 (GB) .................................. 1013857.6

(51) Int. Cl.
*F16K 11/06* (2006.01)
*F16K 31/06* (2006.01)

(52) U.S. Cl.
CPC .......... *F16K 11/06* (2013.01); *F16K 31/0631* (2013.01); *Y10T 137/86879* (2015.04)

(58) Field of Classification Search
CPC .. F16K 31/0627; F16K 31/0631; F16K 39/04; F16K 11/06; B60T 8/341;
(Continued)

(56) References Cited

U.S. PATENT DOCUMENTS 3,661,183 A 5/1972 Komaroff
3,732,893 A 5/1973 Ziesche et al.
(Continued)

FOREIGN PATENT DOCUMENTS

EP 1128110 8/2001
FR 1216389 4/1960
(Continued)

OTHER PUBLICATIONS

International Search Report for Application No. PCT/GB2011/001132 dated Nov. 10, 2011 (2 pages).
(Continued)

*Primary Examiner* — Craig J Price
(74) *Attorney, Agent, or Firm* — Michael Best & Friedrich LLP

(57) ABSTRACT

A directional control valve has a first fluid path extending between first and second ports and a second fluid path between second and third ports. A spherical valve member moves between an open position in which the valve member is displaced from a first valve seat so that the first fluid path is open and is sealed against a second valve seat so that the second fluid path is closed and a closed position in which the valve member is sealed against the first valve seat so that the first fluid path is closed and displaced from the second valve seat so that the second fluid path is open. The valve member is biased towards the closed position by opposed first and second biasing members of unequal loading. An actuator can move the valve member from the closed position to the open position against the unequal loading.

7 Claims, 4 Drawing Sheets

(58) Field of Classification Search
CPC . B60T 8/36; B60T 8/445; B60T 11/28; B60T 8/4827; Y10T 137/86879; Y10T 137/87217; Y10T 137/86574; Y10T 137/8667; Y10T 137/86759; Y10T 137/86622
USPC .............. 137/596.17, 625.2, 625.25, 625.33, 137/625.65, 625.48
See application file for complete search history.

(56) References Cited

U.S. PATENT DOCUMENTS

| | | |
|---|---|---|
| 4,050,477 A | 9/1977 | Acar |
| 4,301,715 A | 11/1981 | Acar |
| 4,391,292 A | 7/1983 | Millar |
| 4,491,154 A | 1/1985 | Peters |
| 4,558,498 A | 12/1985 | Satoh |
| 4,596,273 A | 6/1986 | Kiyoshima |
| 4,610,267 A | 9/1986 | Beck et al. |
| 4,640,391 A | 2/1987 | Maehara et al. |
| 4,824,181 A | 4/1989 | Tomala |
| 4,997,004 A | 3/1991 | Barkhimer |
| 5,011,238 A | 4/1991 | Brown, Jr. |
| 5,098,061 A | 3/1992 | Hohenshil et al. |
| 5,111,840 A | 5/1992 | Miller et al. |
| 5,718,264 A | 2/1998 | Sturman |
| 8,720,400 B2 | 5/2014 | Dinkel et al. |
| 2005/0000578 A1 | 1/2005 | Eberhardt |

FOREIGN PATENT DOCUMENTS

| | | |
|---|---|---|
| FR | 2077101 | 10/1971 |
| GB | 1316334 | 5/1973 |

OTHER PUBLICATIONS

GB1013857.6 Great Britain Search Report dated Nov. 11, 2010 (1 page).

VALVE

CROSS-REFERENCE TO RELATED APPLICATIONS

The application is a continuation application of U.S. patent application Ser. No. 13/814,314 filed Feb. 5, 2013, which is a U.S. national stage entry of International Patent Application No PCT/GB2011/001132, filed on Jul. 29, 2011, which claims the benefit from British Application No. 1013857.6, filed Aug. 19, 2010, all of which are incorporated by reference.

BACKGROUND

The present invention relates to a valve and in particular a directional fluid control valve.

SUMMARY

Directional fluid control valves typically comprise a valve body having a plurality of ports that provide communication between internal flow passages and external flow paths to or from other components. One or more valve members are moveable within the valve body between different switching positions to open or close the flow passages selectively and control the flow direction between ports.

Such valves are typically characterised by the number of ports ("ways") and the number of discrete switching positions they provide. One example of a simple, common directional control valve is a two-position, three-way fluid control valve that provides selective communication between three ports which are typically: a pressure port for connection to a supply of pressurised fluid; a tank port for connection to a reservoir or tank into which fluid is exhausted; and a service port for connection to the intended immediate destination of the fluid. The actuation force that causes the valve element to move between the discrete positions may be provided electrically by, for example, a solenoid, manually via a button or lever for example, mechanically (e.g. using springs or cams etc.), or even via fluid pressure (e.g. a pneumatic pilot signal).

In a typical two position, solenoid operated directional control valve, the valve member is biased into a first position in which it is either open or closed ("normally open" or "normally closed") by a spring and the solenoid is operated to apply a force that overcomes the force applied by the spring so as to move the valve member to the second position. However, the applied force must also be sufficient to overcome any imbalance in fluid pressure forces acting on the valve member and therefore the magnitude is related to the working fluid pressure of the control valve. In applications where high working fluid pressures are used it is necessary to use a heavy duty solenoid or an alternative actuation device resulting in increased costs in both manufacture and power consumption during use.

One conventional valve mechanism comprises a poppet design which comprises a single piece valve stem with integral poppets arranged to open and close valve ports as the stem is moved axially. This design requires a high manufacturing tolerance to ensure effective sealing of the ports and is prone to wear.

A solenoid-operated directional control valve available from the applicant under model no. FP01 comprises three co-axial pins arranged in a line, the central pin being separated from each of the outer pins by a ceramic sphere which operates as a valve member in conjunction with an associated valve seat. The pins and spheres are free to move in the axial direction between two positions in which the spheres are forced against or move away from their respective seats, thus opening and closing respective fluid paths. This arrangement overcomes some of the problems associated with the poppet design and the use of moulded ceramic spheres provides for a greater degree of sealing precision and wear resistance.

There is a desire for a simple, inexpensive yet robust valve in which the actuation force is reduced in comparison to traditional valve mechanisms.

It is an object of the present invention to obviate or mitigate the above, and other, disadvantages. It is also an object to provide for an improved directional fluid control valve.

According to the present invention there is provided a directional control valve comprising: a housing defining first, second and third ports; a first fluid path between the first and second ports and a second fluid path between the second and third ports; a chamber defined at an intersection of the first and second fluid paths; a substantially spherical valve member disposed between opposed, spaced valve seats in the chamber; the valve member being movable across the chamber between the valve seats between an open position in which the valve member is displaced from a first valve seat so that the first fluid path is open and is sealed against a second valve seat so that the second fluid path is closed and a closed position in which the valve member is sealed against the first valve seat so that the first fluid path is closed and displaced from the second valve seat so that the second fluid path is open; the valve member being biased towards the closed position by opposed first and second biasing members of unequal loading; and an actuator for moving the valve member from the closed position to the open position.

The actuator is thus operable to move the valve member to the open position against the biasing force provided by the first and second biasing member of unequal loading.

The valve seats are preferably concave in order to receive the spherical valve member in a sealing relationship.

The valve seats are preferably separated by a short distance, slightly greater than the diameter of the spherical valve member so as to limit the length of travel of the valve member between the first and second positions. The movement of the valve member between the valve seats is preferably in a linear direction across the chamber.

A first actuating pin may be arranged coaxially with the first valve seat for moving the valve member to the open position, the first actuating pin being acted on by the first biasing member and the actuator. The valve member may be movable towards the first valve seat by means of a second actuating pin arranged coaxially with the second valve seat on an opposite side of the valve member to the first actuating pin, the second pin being acted on by the second biasing member.

The first and second pins are preferably elongate. They may be moveable along their longitudinal axes into and out of abutment with the valve member, which may be moved along the same axes. The pins may be coaxially aligned.

The valve seats may be defined by valve elements received in the housing to which they are preferably sealed. The valve elements are preferably spaced apart to define the chamber between them. The valve elements may each have a central bore for receipt of one of the first or second actuating pins. The first and second actuating pins may be slidable in the central bore. They may be slidable in dynamic seals.

There may be a radial clearance between each of the actuating pins and the valve element at the valve seat end. The clearance forms part of the respective fluid path.

The first fluid path may include at least one passage extending from an outer surface of a first valve element to the central bore and the second fluid path may include at least one passage extending from an outer surface of a second valve element to the central bore. The passage(s) may be inclined at an acute angle to the central bore.

There may be a plurality of passages in each of the first and second valve elements. These may be angularly spaced around the axis of the central bore. An outer surface of the first and/or second valve elements may have a recess that provides fluid communication between the plurality of passages in the valve element. The radial clearance between each actuating pin and the valve element may provide fluid communication between the chamber and the passage in that valve element.

A spacer may maintain the first and second valve seats at a predetermined distance apart. The spacer may define part of the first and second fluid paths permitting fluid communication between the second port and the chamber. It may be disposed between the first and second valve elements.

The spacer may be an annular member with a plurality of substantially radially extending ports therethrough for communication between the second port and the chamber.

The spacer may have a peripheral recess to allow for the flow of fluid around its periphery.

The first and second biasing members may be of any convenient form such as, for example, springs and in particular compression coil springs, which may be pre-loaded by compression between spring seats.

The actuator may be of any suitable kind such as, for example, a solenoid. The solenoid has a push rod which may be connected directly or indirectly to the first actuating pin. A first coil spring may be coaxially mounted over the push rod or an extension thereof.

There may be provided at least one adjuster for adjusting the degree of compression of the first or second spring so as to adjust the biasing spring force.

A specific embodiment of the invention will now be described, by way of example only, with reference to the accompanying drawings, in which.

DETAILED DESCRIPTION

Figure 3:
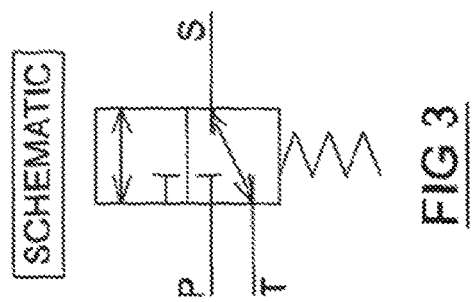
FIG. 3 is a diagrammatic representation of the valve of FIGS. 1 and 2.

Referring now to the figures, a two position, three-way solenoid-operated fluid control valve comprises a generally parallelepiped valve body 1 having a three ports: pressure P for connection to a supply of pressurised fluid, tank T for connection to a tank or reservoir and service S for connection to a fluid circuit.

The valve body 1 has a central bore 5 of circular cross-section along its longitudinal axis which receives a valve element, which comprises two segments 6, 7 axially separated by an annular spacer 8. Each valve element segment 6, 7 is sealed to the internal bore surface of the valve body 1 by a pair of O-rings seals 9, 10 that are received in respective annular recesses at each end of the external surface of the valve element 6, 7. Between each pair of O-ring seals 9, 10 the external surface of the valve element 6, 7 has a relatively wide and shallow annular groove 11, 12 (see FIGS. 4 to 6) for communication with the pressure or tank ports P, T. The O-ring seals 9, 10 ensure that fluid does not leak across the valve element 6, 7 unless it passes through specific conduits.

Each of the valve element segments 6, 7 has an axial central bore 13 in which a respective metallic actuating pin 14, 15 is free to slide in an axial direction. Between the pins 14, 15 there is a precision formed sphere 16 which may be produced from, for example, a ceramic or a suitable metal such as tungsten carbide. The sphere 16 should be resistant to pressure, temperature and corrosion. The inwardly facing ends of each of the valve elements 6, 7 have deep annular recesses 17, 18 designed to receive the annular spacer 8 which holds the valve element segments 6, 7 apart sufficiently to accommodate the sphere 16 and to allow for it to travel by a limited amount in an axial direction between concave valve seats 19, 20 which are defined around the central bore 13 radially inboard of the annular recesses 17, 18.

The pins 14, 15 run in dynamic seals 21 located in recesses of the inner surfaces of the valve elements 6, 7. These seals 21 ensure that no leakage occurs at either end of the central bore 13 of the valve elements and are typically manufactured from a low friction material such as a PTFE-based compound, energised by an O-ring seal, so that the force required to move the pins 14, 15 in the seals 21 is kept relatively low. The inwardly facing end of each pin 14, 15 has a slightly reduced diameter to define a small radial clearance 22, 23 (best seen in FIG. 5) for fluid to flow between it and the respective valve element 6, 7. This clearance 22, 23 leads to angled passages 24, 25 that extend at an acute angle from the central bore 13 to the shallow annular groove 11, 12 to provide communication with the respective ports P, T, S. Any suitable number of such passages may be provided in the valve element with four being provided in the embodiment shown in the figures (only two of which are visible in the sectioned view of FIGS. 4 to 6).

Figure 2:
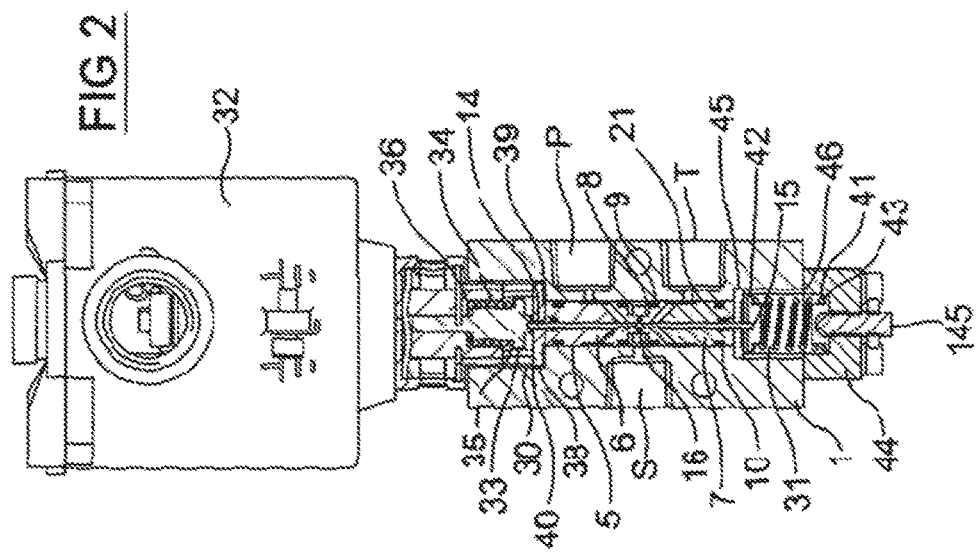
FIG. 2 is a longitudinal front part-sectioned view of the valve, along line A-A of FIG. 1.
Figure 1:
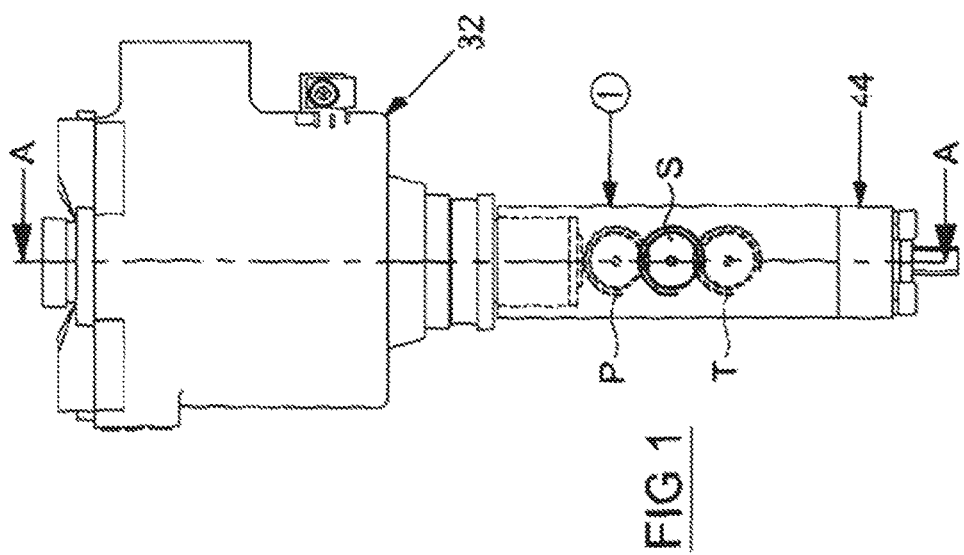
FIG. 1 is a longitudinal side view of a solenoid-operated directional fluid control valve in accordance with the present invention.

In the embodiment shown in the figures the pressure port P is connected to the shallow annular groove 11 in a first (uppermost in FIGS. 2, 4 and 6) valve element segment 6 whereas the tank port T is connected to the shallow annular groove 12 in the second (lowermost) valve element 7. The service port S is, by contrast, in fluid communication with the annular spacer 8 which has a peripheral recess 26 to allow fluid to flow around its outer surface and a plurality of radial ports 27 for fluid to flow radially to/from the region around the sphere 16.

The central bore 5 in the valve body 1 is flanked at each end by a coaxial cylindrical cavity 30, 31 of larger diameter for receipt of spring-loading assembly for applying axial forces to the pins 14, 15 and sphere 16. A first end of the valve body 1 is connected by any suitable means of attachment to a solenoid 32, the push rod of which is connected to an adapter 33 to form an integral assembly. A spring 34 is coaxially disposed over the adapter 33 and is compressed between two spring seats, a first of which is defined by an annular shoulder 35 of the push rod adapter and a second of which is defined by an annular shoulder 36 of the solenoid body.

The push rod adapter 33 has a short blind bore 37 for receipt of the outer end of the first pin 14 and acting under the influence of the spring 34 the adapter 33 biases the pin 14 towards the centre of the valve body 1.

The valve element segment 6 at the first end of the valve body 1 is retained in the central bore 5 by means of a load bush 38 which has a central aperture 39 through which the first pin 14 passes. The load bush 38 is, in turn, held in place by means of a clamping ring 40 whose outer periphery is threaded for engagement with a complementary thread defined in the wall of the cylindrical cavity 30.

The cylindrical cavity 31 at the second end of the valve body 1 receives a second spring 41 which acts between a first spring seat 42 connected to the outer end of the second pin 15 and a second spring seat 43 under an end cap 44 that closes the cavity 31. The second spring seat 43 is axially moveable by an adjuster screw 45 whose threads engage in a tapped bore in the end cap 44. The force applied by the second spring 41 to the second pin 15 is simply adjusted by turning the adjuster screw to compress or extend slightly the spring 41. The second valve element 7 is retained in the central bore 5 by means of the washer 45 which is turn is held in place by a load bush 46 that extends between the washer 45 and the end cap 44.

Figure 4:
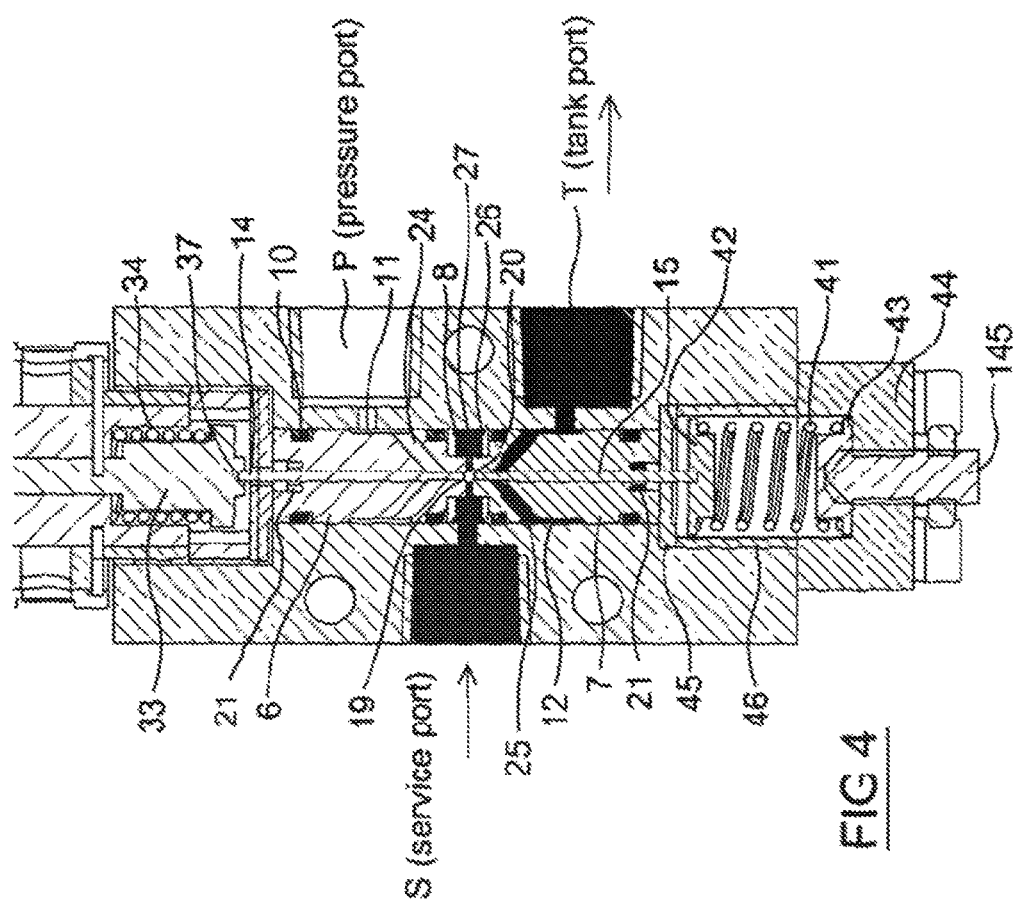
FIG. 4 is an enlarged longitudinal sectioned view of the valve of FIGS. 1 to 3 with the solenoid removed and showing the valve in a first position.
Figure 5:
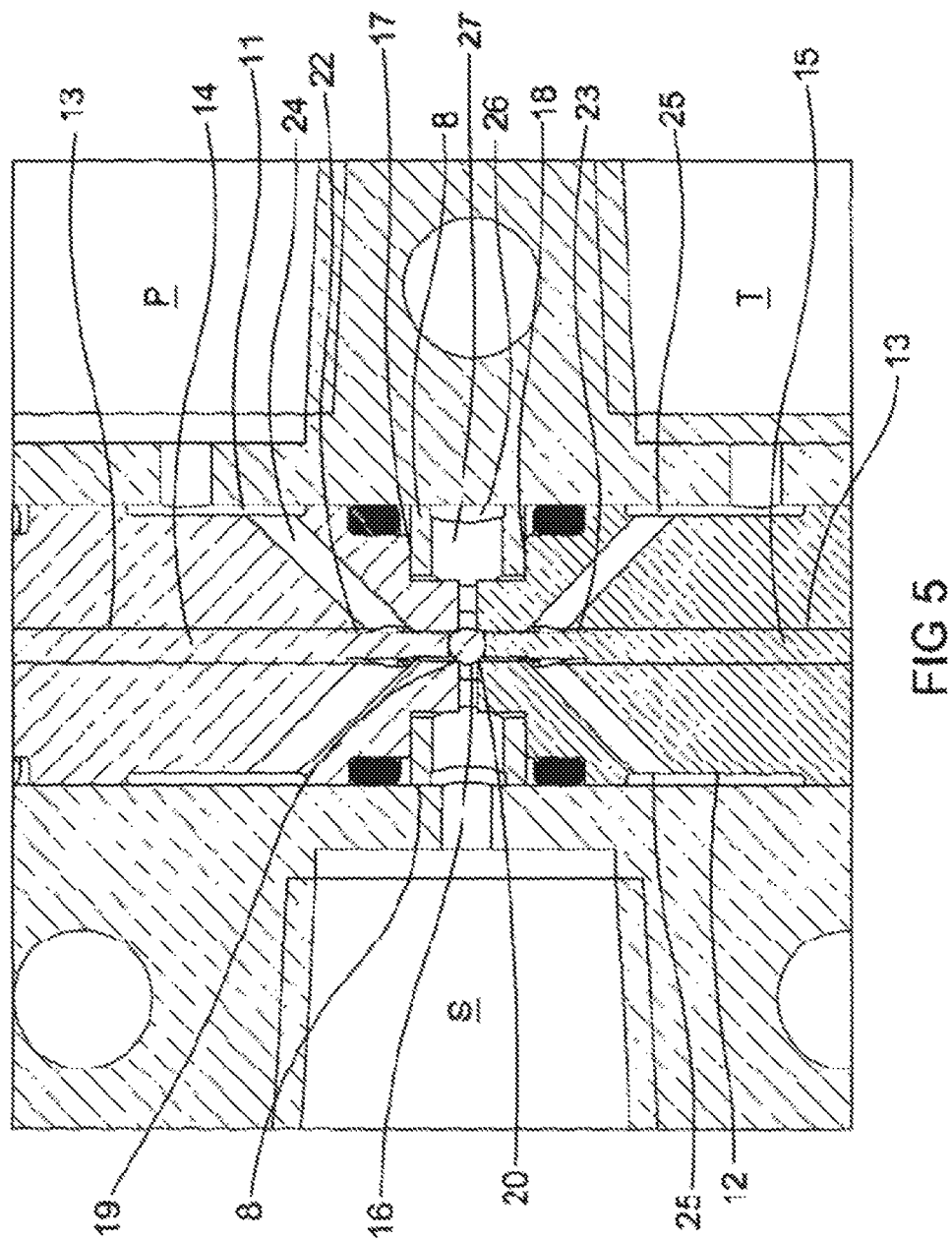
FIG. 5 is an enlarged view of the central section of FIG. 4.
Figure 6:
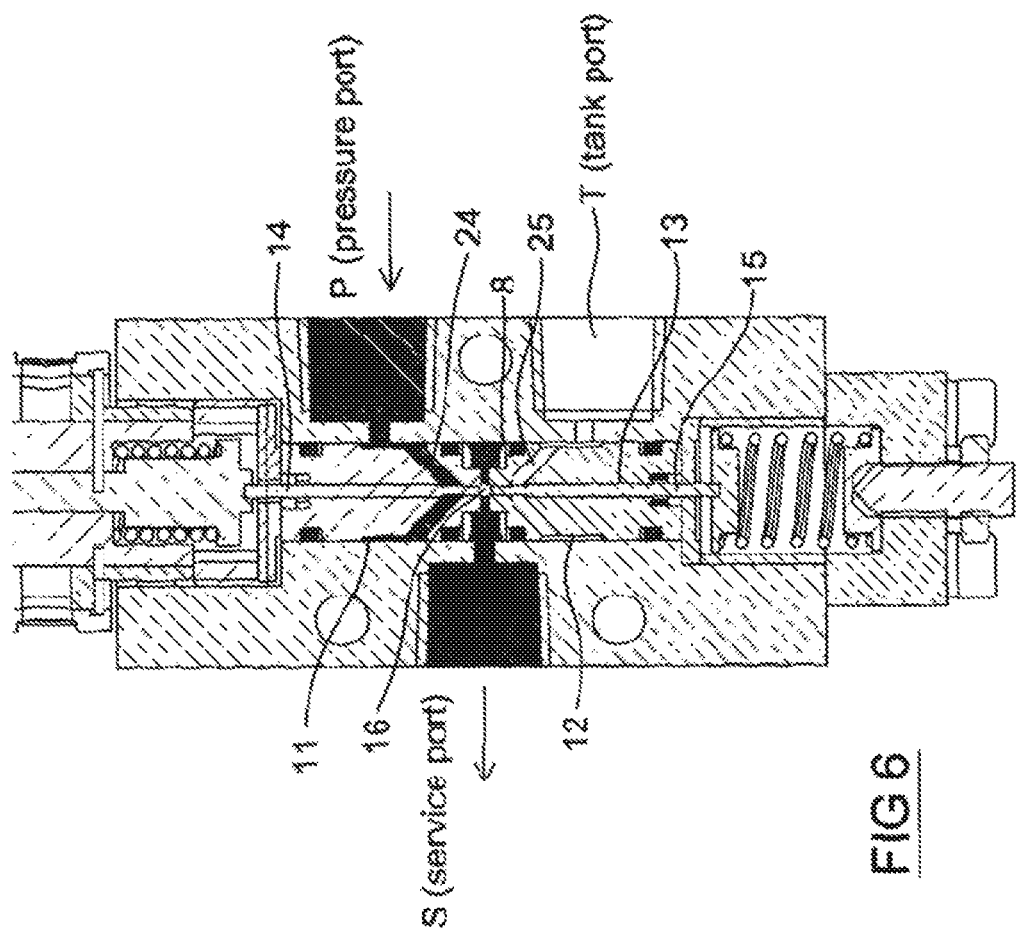
FIG. 6 corresponds to FIG. 4 but with the valve in a second position.

In operation, the springs 34, 41 act in opposite directions on the first and second pins 14, 15. The second spring 41 (the lower spring in FIGS. 4 and 6) is designed to have a larger force than that of the first spring 34 so that it overcomes the imbalance of forces provided by the pressure of the fluid acting on the net area of the sphere 16 and the pin 15 as well as the opposite force of the first spring 34. This force results in the second pin 15 being pushed upwardly. The force on the pin 15 in this direction moves the sphere 16 away from the seat 20 on the second (lower) valve element 7 and into sealing engagement with the seat 19 of the first (upper) valve element 6, as is illustrated in FIGS. 4 and 5. In this position fluid from the service port S is able to flow in through the radial ports 27 of the annular spacer 8, between the sphere 16 and the second pin 15 and along the clearance 23 between the end of the pin 15 and the valve element 7 to the angled passages 25 from where it feeds the shallow annular groove 12 and egresses through the tank port T. This is the (normally closed) position of the valve which it occupies if the solenoid 32 is de-energised and ensures that any pressure in the service line S is exhausted to the tank, as represented in FIG. 4. The pressure port P is prevented from communication with the other ports T, S by means of the sphere 16 being sealed against the valve seat 19 of the first valve element 6.

Energisation of the solenoid 32 applies a force to the pusher rod that is transmitted to the first pin 14 via the adapter 33. The force is large enough to overcome the biasing force of the second spring 41, any increase in the imbalance of the spring forces (as a result of further compression of the second spring 41 and extension of the first spring 34) and the imbalance of forces applied by the fluid pressure acting on the pins 14, 15 and net area of the sphere 16. The first pin 14 is pushed against the sphere 16 to move it from the seat 19 of the first valve element 6 into sealing contact with the seat 20 of the second (lower) valve element 7. This allows fluid from the pressure port P to flow around the shallow annular groove 11 in the first valve element 6, along the inclined passages 24, the clearance 22 between the end of the pin 14 and the valve element 6, past the sphere 16 and into the annular spacer 8 from where it egresses through the radial ports 27 to the service port S. Flow is prevented from reaching the tank port T by virtue of the sphere 16 being sealed against the second (lower) valve element seat 20.

The opposing springs 34, 41 provide balance and ensure that the solenoid force required to move the valve from the closed to the open position is of a relatively low magnitude and is not dependent on the pressure of the service fluid.

The dynamic seals 21 present the same area to the fluid so that the forces are equal and opposite.

The annular spacer 8 dictates the spacing between the valve elements 6, 7 and therefore the stroke length of the pins 14, 15 and the permitted travel of the sphere 26. The axial travel of the sphere 16 is limited by the spacer 8 such that it does not move away from either of the seats 19, 20 by any significant distance and therefore significant lateral movement is prevented. This is desirable as such movement causes misalignment and potential damage to the valve seat and/or sphere.

The valve may have application in any environment including in particular, sub-sea, on shore, or in arctic conditions.

It is will be appreciated by one of ordinary skill in the art that the invention has been described by way of example only, and that the invention itself is defined by the claims. Numerous modifications and variations may be made to the exemplary design described above without departing from the scope of the invention as defined in the claims. For example, the valve need not be solenoid-operated but may be actuated by a mechanical device (e.g. push button, lever or cam-operated device), a pneumatic pilot pressure (using a piston diaphragm or otherwise). Furthermore it is to be appreciated that the number of radial ports 27 in the spacer 8 and/or the number of inclined passages 24, 25 may be varied depending on the volumetric flow rates required.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Various features of the disclosure are set forth in the following claims.

What is claimed is:

1. A two position, three-way solenoid-operated fluid control valve comprising:
 a valve body having three ports respectively for connection to a supply of pressurised fluid, a tank or reservoir and a fluid circuit, the valve body comprising a central bore;

a valve element received in said central bore and comprising first and second segments, wherein each segment comprises
   a pair of seals at each end of the external surface of the valve element such that the segment is sealed to the internal bore surface of the valve body,
   an annular groove axially between the seals for communication with one of said ports,
   an axial central bore,
   an inwardly facing end having an annular recess and a concave valve seat defined around the central bore radially inboard of the annular recesses;
a first actuating pin slidably positioned within the axial central bore of the first segment and a second actuating pin slidably positioned within the axial central bore of the second segment;
an annular spacer disposed between the segments and received in the annular recesses of the inwardly facing ends for axially spacing the segments;
a spherical valve member positioned between the concave valve seats of the first and second segments; and
wherein the valve further comprises
a solenoid and a first spring at a first end of the valve body and arranged to bias the first actuating pin in a first axial direction; and
a second spring at a second end of the valve body and arranged to bias the second actuating pin in an opposing axial direction,
wherein the solenoid comprises a push rod connected directly or indirectly to the first actuating pin,
wherein a first end of the valve body is connected to the solenoid and the push rod is connected to an adapter to form an integral assembly.

2. A fluid control valve as claimed in claim 1, wherein the first spring is coaxially disposed over the adapter and is compressed between two spring seats a first of which is defined by an annular shoulder of the push rod adapter and a second of which is defined by an annular shoulder of the solenoid body.

3. A fluid control valve as claimed in claim 1, wherein the first and second actuating pins are slidable in the central bore in dynamic seals, the dynamic seals of the first and second actuating pins presenting the same area to the fluid so that the forces are equal and opposite.

4. A fluid control valve as claimed in claim 1, wherein there are a plurality of passages inclined at an acute angle to the central bore in each of the first and second valve elements, the outer surface of the first and second valve elements having a recess that provides fluid communication between the plurality of passages.

5. A fluid control valve according to claim 1, further comprising at least one adjuster for adjusting the biasing force of at least one of the first and second springs.

6. A fluid control valve as claimed in claim 1, wherein the first and second springs are balanced to ensure that the solenoid force required to move the valve from the closed to the open position is of a relatively low magnitude and is not dependent on the pressure of the service fluid.

7. A fluid control valve as claimed in claim 1, wherein the second spring has a larger biasing force than that of the first spring and overcomes the imbalance of forces provided by the pressure of the fluid acting on a net area of the valve element and one of said actuating pins as well as the opposite force of the first spring.

\* \* \* \* \*